Feb. 18, 1969　　　J. L. LAVOIE　　　3,427,809
ROCKET THRUST VECTORING APPARATUS

Filed Dec. 8, 1966　　　　　　　　　　　Sheet 1 of 2

INVENTOR.
JOHN L. LAVOIE
BY Edwin D. Grant

ATTORNEY

United States Patent Office 3,427,809
Patented Feb. 18, 1969

3,427,809
ROCKET THRUST VECTORING APPARATUS
John L. Lavoie, Ogden, Utah, assignor to Thiokol Chemical Corporation, Bristol, Pa., a corporation of Delaware
Filed Dec. 8, 1966, Ser. No. 600,218
U.S. Cl. 60—231
Int. Cl. F02k 1/20; B63h 25/46; B64c 15/10
3 Claims

ABSTRACT OF THE DISCLOSURE

A rocket motor thrust vector control system in which a secondary fluid is injected into the rocket exhaust gases from a source contained within a central housing contained within the motor. The combustion gases pressurize the secondary fluid and a valve system controls its flow.

---

This invention relates to rocket motors and more particularly to apparatus for changing the direction of thrust of a rocket motor.

Heretofore the line of application of the thrust of a rocket motor has been vectored by injecting a liquid or gas through an orifice in the wall of its thrust nozzle, the injected fluid being held in pressurized containers which are generally mounted on the aft end of the rocket motor. Such an arrangement has several disadvantages, including the loss in rocket payload which results from the weight of the pressurization system and supply conduits employed to pressurize the reservoirs which hold thrust vectoring fluid. Furthermore, the withdrawal of thrust vectoring fluid from a container mounted on the aft end of a rocket motor causes a considerable shift in the center of gravity of the rocket motor, which complicates the problem of programming the flight path of the rocket motor.

It is accordingly an object of this invention to provide an improved rocket motor thrust vectoring apparatus.

Another object of the invention is to provide uncomplicated, lightweight rocket motor thrust vectoring apparatus.

An additional object of the invention is to minimize the shift in the center of gravity of a rocket motor which results from use of secondary injection thrust vector control.

These and other objects of the invention are achieved by means of embodiments each of which comprises a thrust vector control member adapted for injecting fluid laterally out from the central portion of a rocket thrust nozzle into the exhaust stream discharged therethrough, said fluid being stored within said thrust vector control member in the central portion of a rocket motor.

Figure 1:
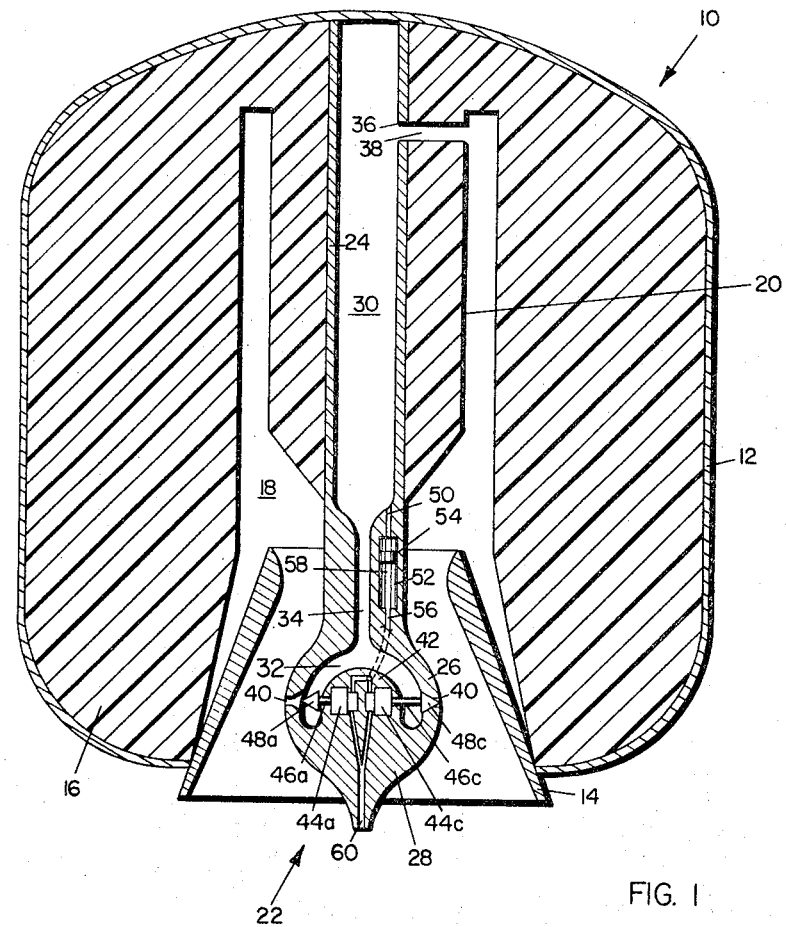
Figure 2:
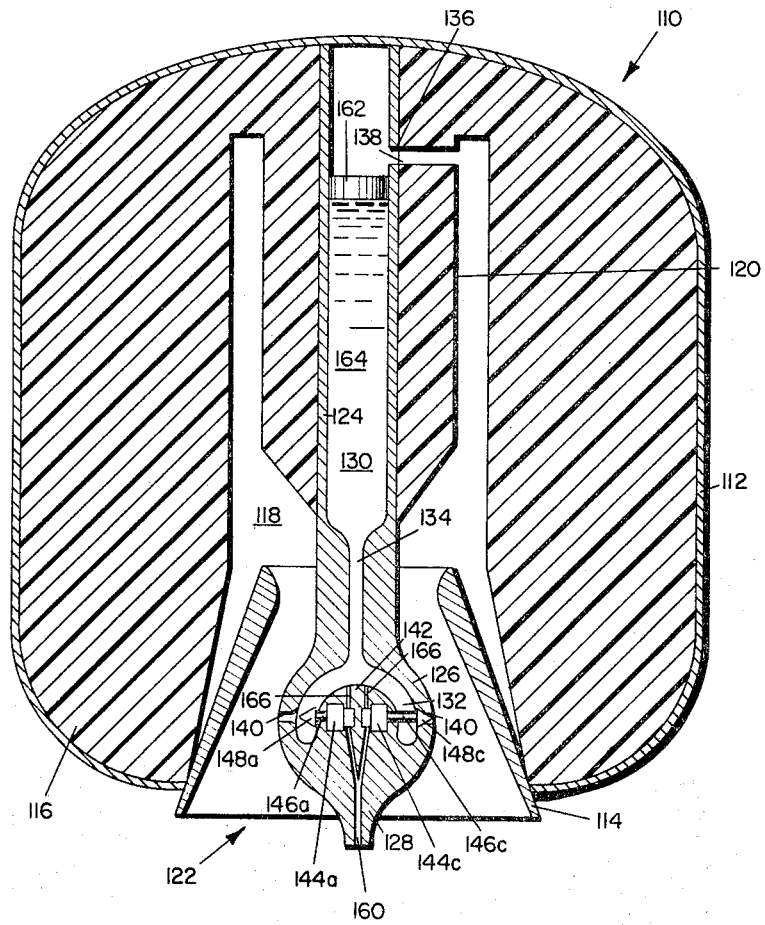

Other objects and advantages of the invention will become apparent as the following description is read with reference to the accompanying drawings, wherein:

FIGURE 1 is a sectional view taken along the longitudinal axis of a rocket motor in which a preferred embodiment of the invention is utilized; and FIGURE 2 is a sectional view taken along the longitudinal axis of a rocket motor in which another preferred embodiment of the invention is utilized.

Throughout the specification and the drawings, like reference numbers designate like parts.

In FIGURE 1 is illustrated a rocket motor (generally designated by the number 10) comprising a casing 12, a thrust nozzle 14 of the so-called "submerged" type mounted on the aft end of said casing, and a solid propellant grain 16 fixedly disposed within said casing. Grain 16 is formed with a central perforation 18 which defines a combustion chamber within casing 12, and includes a tubular portion 20 that is concentrically positioned within said perforation. In accordance with the invention, rocket motor 10 is provided with a thrust vector control member (generally designated by the number 22) comprising an elongated, hollow housing 24 which extends through portion 20 of grain 16, the forward end of said thrust vector control member being fixedly connected to the inner surface of the forward end of casing 12 and the aft end thereof being centrally disposed within thrust nozzle 14. To provide room for components that will be described hereinafter, the aft end of housing 24 is made larger than the remainder of said housing and, more particularly, comprises a substantially spherical portion 26 and a conical portion 28 integrally joined to said spherical portion. The interior of housing 24 is formed with three continuous cavities, namely, a first cylindrical cavity 30, a second cavity 32, and a passage 34 communicatively connecting said first and second cavities. Housing 24 is provided with an inlet 36 adjacent the forward end thereof, this inlet being in communication with a passage 38 that extends through portion 20 of grain 16 to the perforation 18 therein, and the housing is also provided with a plurality of injection orifices 40 (only two of which are illustrated) the longitudinal axes of which are transverse to the longitudinal axis of thrust nozzle 14. Injection orifices 40 are spaced at equal intervals circumferentially of portion 26 of housing 24 and are thus located within thrust nozzle 14.

The wall of cavity 32 defines a forwardly projecting support member 42 in which are mounted a plurality of controllers 44a through 44d (only two of which are illustrated) of conventional construction, said controllers being spaced circumferentially of said support member 42 and radially aligned with respective ones of the injection orifices 40. Each controller 44 includes a drive shaft 46a through 46d on the free end of which is a contoured valve 48a through 48d, this shaft being movable by operation of its controller 44 between a first position thereof wherein the valve 48 closes a respective one of the injection orifices 40 (as illustrated in FIGURE 1 by the position of the valve 48c driven by the controller 44c located in the right-hand portion of support member 42) and a second position thereof wherein said valve is spaced away from the same injection orifice (as illustrated in FIGURE 1 by the position of the valve 48a driven by the controller 44a located in the lefthand portion of support member 42). Fluid pressure for operating the controllers 44a through 44d is supplied by a pressurizing system comprising a conduit 50 that extends between cavity 30 and a chamber 52 formed in the wall of housing 24, a piston 54 slidably disposed within said chamber, a first conduit network 56 communicatively connecting said chamber with each of said controllers, and a pressurizing fluid 58 disposed within said conduit network 56 and the portion of said chamber aft of said piston. A second conduit network 60 is also provided to conduct displaced pressurizing fluid 58 from the controllers to a low pressure area after they have been operated.

It will be recognized that the above-described components of the embodiment of the invention illustrated in FIGURE 1 can be made of many different materials which are employed in the construction of rocket motors. Preferably housing 24 is formed of an insulated metal which is capable of withstanding the hot gas generated by combustion of solid propellant grain 16. Controllers 44, drive shafts 46, and valves 48 can be formed of a heat-resistant metal such as tungsten.

When grain 16 is ignited, a portion of the combustion gas thereof passes through passage 38 and inlet 36 into the interior of housing 24 and pressurizes cavity 32 in portion 26 of said housing to a pressure that is substantially the same as the pressure within the combustion chamber of rocket motor 10. Thereafter one or more of the controllers 44 can be actuated by conventional control means (not shown) operably connected thereto to open and close selected ones of the injection orifices 40. The pressure within thrust nozzle 14 is considerably less than the pressure within cavity 32 and thus when one of the injection orifices is opened combustion gas within said cavity is injected laterally into the exhaust stream flowing through thrust nozzle 14. As will be understood by persons skilled in the art of thrust vector control by secondary injection, this injection of gas into the exhaust stream flowing through thrust nozzle 14 changes the thrust vector of rocket motor 10.

An important advantage of the aforedescribed embodiment of the invention is that it provides thrust vectoring of a rocket motor without requiring the storage of injection fluid in separate containers mounted on the rocket motor casing. Since most of the wall of housing 24 within casing 12 is surrounded by solid propellant (more specifically, the solid propellant of portion 20 of grain 16) and since the pressure inside and outside this portion of said housing are substantially equal, this portion of said housing can be made of thin, lightweight material. In contrast, the separate containers for injection fluid employed in conventional arrangements must be of heavy construction so that they can withstand the relative high pressure required for injecting fluid into the exhaust stream of a rocket motor. In addition, the described embodiment does not require pumps for pressurizing the gas injected into thrust nozzle 14, as would be required in conventional secondary injection thrust vector control apparatus. Consequently by means of the invention the payload of a rocket guided by secondary injection thrust vector control is increased. Furthermore, the arrangement of the aforedescribed embodiment of the invention provides for thrust vectoring of rocket motor 10 by secondary injection into thrust nozzle 14 while eliminating the considerable shift of the center of gravity that would occur if injection fluid were stored in separate containers mounted on the aft end of said rocket motor. Another advantage provided by the described embodiment of the invention is that the vector moment of thrust vector control member 22 can be readily varied by changing the length of housing 24 to position the injection orifices 40 at different points within thrust nozzle 14. The invention also enables secondary injection to be conveniently employed in submerged thrust nozzles.

FIGURE 2 illustrates a second preferred embodiment of the invention which is similar in construction to the first embodiment illustrated in FIGURE 1 but which differs therefrom in that a liquid is employed for thrust vectoring instead of the combustion gas employed in said first embodiment. It should be noted, therefore, that since the invention encompasses embodiments capable of effecting thrust vectoring of a rocket by use of both a liquid and a gas, the term "thrust vectoring fluid" which appears in claims appended hereto is intended to include within its scope both liquids and gases. Because of the similarity between the first and second embodiments, components of the second embodiment which correspond in construction and function to components of the first embodiment are designated by the same numbers increased by 100. Thus, for example, housing 124 of the embodiment illustrated in FIGURE 2 corresponds to housing 24 of the embodiment illustrated in FIGURE 1. However, as will become evident hereinafter, the construction of housing 124 is slightly different from that of housing 24.

Slidably disposed within cavity 130 of housing 124 is a piston 162, this piston being near (and on the aft side of) inlet 136 of said housing prior to thrust vectoring of rocket motor 110. A thrust vectoring fluid 164 is disposed within the portion of cavity 130 aft of piston 162, bore 134, and cavity 132. Because of the presence of this thrust vectoring fluid 164, the controller pressurizing system of the embodiment of the invention illustrated in FIGURE 1 (i.e., conduit 50, chamber 52, piston 54, first conduit network 56, and pressurizing fluid 58) is not required in the second embodiment of the invention. Fluid pressure for operation of the controllers 144 mounted in support member 142 of housing 124 is instead provided by four conduits 166 (only two of which are illustrated) each of which extends between a respective one of said controllers and cavity 132, thus permitting a portion of the thrust vectoring fluid 164 to flow to the controllers when the latter are operated. As in the arrangement of the aforedescribed embodiment of the invention, a conduit network 160 is provided in housing 124 to allow thrust vectoring fluid 164 to escape from the controllers 144 after they have been operated.

When grain 116 is ignited, a portion of the combustion gas thereof passes through passage 138 and inlet 136 into the portion of cavity 130 forward of piston 162 and urges said piston toward the injection orifices 140. Thus thrust vectoring fluid 164 is placed under a pressure substantially equal to the pressure within the combustion chamber of rocket motor 110. Since the pressure within thrust nozzle 114 is considerably less than this pressure, thrust vectoring fluid 164 is injected into the exhaust stream flowing through thrust nozzle 114 when any one of the valve seats 148 is moved out of its injection orifice 140.

The arrangement of above-described second embodiment of the invention provides for increased payload of a rocket by storing thrust vectoring fluid within a container (i.e., housing 124) which can be of lightweight construction (for the same reasons given in the description of the advantages of the first embodiment of the invention). Furthermore, the storage of thrust vectoring fluid 164 within the portion of housing 124 that is centrally located within rocket motor 110 minimizes the shift of gravity of said rocket motor as the thrust vectoring fluid is discharged from said housing.

Other embodiments of the invention will be obvious in view of the preceding description of the concepts of the invention. For example, an end burning grain can be substituted for grain 16 of the embodiment illustrated in FIGURE 1, in which modification it would be necessary to locate the inlet 36 in housing 24 between the forward end of thrust nozzle 14 and the aft end surface of the end burning grain. Also in other embodiments of the invention the thrust vector control member 22 can be formed with thrust vectoring fluid supply orifices which extend longitudinally therethrough to a reservoir mounted on the forward end of the casing to which said thrust vector control member is mounted. Obviously the controllers 44, 144 of the two illustrated embodiments can be replaced with other suitable valve designs. Therefore, it is to be understood that the scope of the invention is limited only by the terms of the appended claims.

What is claimed is:
1. In a rocket motor having a thrust nozzle, the combination comprising:
   a hollow housing carried by said rocket motor and having at least a portion thereof disposed within said thrust nozzle and spaced from the inner surface thereof, at least one injection orifice extending through the wall of said housing at the portion thereof disposed within said thrust nozzle, the longitudinal axis of said injection orifice being substantially transverse to the longitudinal axis of said thrust nozzle;
   means for pressurizing the interior of said housing with a fluid;
   valve means contained within said hollow housing for opening and closing said injection orifice at selected times, whereby said fluid is selectively injected into the exhaust stream flowing through said thrust nozzle to vector the thrust of said motor; and
   conduit means connecting said valve means to said means for pressurizing said housing interior and said valve means to a low pressure area outside said housing.

2. In a rocket motor comprising a casing, a thrust nozzle mounted on the aft end of said casing, a solid propellant grain fixedly disposed within said casing, and a combustion chamber within said casing, the combination comprising:

an elongated, hollow housing the forward end of which is fixedly connected to the inner surface of the forward end of said casing and the aft end of which is disposed within said thrust nozzle and evenly spaced from the inner surface thereof, said housing having therein at least one inlet which places the interior thereof in communication with said combustion chamber and also having therein a plurality of injection orifices the longitudinal axes of which are substantially transverse to the longitudinal axis of said thrust nozzle, said injection orifices being spaced apart circumferentially of said housing and located within said thrust nozzle; and valve means for opening and closing each of said injection orifices at selected times, whereby combustion gas of said solid propellant grain enters the interior of said housing through said inlet therein and is selectively injected into the exhaust stream flowing through said thrust nozzle to vector the thrust of said rocket motor.

3. In a rocket motor comprising a casing, a thrust nozzle mounted on the aft end of said casing, a solid propellant grain fixedly disposed within said casing, and a combustion chamber within said casing, the combination comprising:

an elongated, hollow housing the forward end of which is fixedly connected to the inner surface of the forward end of said casing and the aft end of which is disposed within said thrust nozzle and evenly spaced from the inner surface thereof, said housing having therein at least one inlet which places the interior thereof in communication with said combustion chamber and also having therein a plurality of injection orifices the longitudinal axes of which are substantially transverse to the longitudinal axis of said thrust nozzle, said injection orifices being spaced apart circumferentially of said housing and located within said thrust nozzle;

a piston slidably disposed within said housing between said inlet and said injection orifices;

a thrust vectoring fluid disposed within said housing between said piston and said injection orifices; and valve means for opening and closing each of said injection orifices at selected times, whereby combustion gas of said solid propellant grain enters the interior of said housing through said inlet therein and urges said piston toward said injection orifices, and said thrust vectoring fluid is selectively injected into the exhaust stream flowing through said thrust nozzle to vector the thrust of said rocket motor.

References Cited

UNITED STATES PATENTS

| 3,239,150 | 3/1966 | Chisel | 60—231 XR |
| 3,255,971 | 6/1966 | Widell | 60—231 XR |
| 3,259,320 | 7/1966 | Frey | 239—265.23 |
| 3,279,186 | 10/1966 | Sippel et al. | 60—231 |
| 3,296,799 | 1/1967 | Fuentes | 60—231 |

CARLTON R. CROYLE, Primary Examiner.

U.S. Cl. X.R.

60—253, 271; 239—265.23